(12) United States Patent
Guzik et al.

(10) Patent No.: US 7,532,006 B2
(45) Date of Patent: May 12, 2009

(54) STAND-ALONE QUASI-STATIC TESTER

(75) Inventors: Nahum Guzik, Palo Alto, CA (US); Adrian Hodgkinson, Alameda, CA (US); Forest Ray, Redwood City, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 97 days.

(21) Appl. No.: 11/881,815

(22) Filed: Jul. 27, 2007

(65) Prior Publication Data
US 2008/0247091 A1 Oct. 9, 2008

Related U.S. Application Data

(60) Provisional application No. 60/922,096, filed on Apr. 6, 2007.

(51) Int. Cl.
*G01R 33/12* (2006.01)
(52) U.S. Cl. .................................................... 324/210
(58) Field of Classification Search ......... 324/210–212, 324/228, 234, 239; 360/313, 245.3, 246.4
See application file for complete search history.

(56) References Cited

U.S. PATENT DOCUMENTS 6,212,045 B1 * 4/2001 Guzik ..................... 360/255.2
6,486,660 B1 * 11/2002 Luse et al. .................. 324/210
7,444,880 B2 * 11/2008 Zhang et al. ................. 73/779
2005/0258827 A1 * 11/2005 Patland et al. .............. 324/210
2008/0137075 A1 * 6/2008 Fujii et al. .................... 356/73

FOREIGN PATENT DOCUMENTS

JP         2006-78713     *  3/2006

OTHER PUBLICATIONS

International Business Machines Corporation, "HGA slider serial reading method involves bending light passing thru fiber and les with mirrors and Is illuminated to serial number of slider so that CCD camera gets clear image thru mirrors and lens", Feb. 20, 2001, Derwent Pub. No. RD 443150A.*

* cited by examiner

*Primary Examiner*—Jay M Patidar
(74) *Attorney, Agent, or Firm*—Foley & Lardner LLP; Joseph M. Maraia

(57) ABSTRACT

A quasi-static tester is disclosed. The quasi static tester comprises: a mount configured to fix a head gimbal assembly in a given position; a camera configured to observe the head gimbal assembly when the head gimbal assembly is fixed in the mount, wherein the camera is used to position the head gimbal assembly in an observation position; and a magnet for performing quasi-static testing of the head gimbal assembly when the head gimbal assembly is fixed in the mount, wherein the observation position and a testing position in a uniform area of the magnet are a predetermined distance apart.

27 Claims, 8 Drawing Sheets

STAND-ALONE QUASI-STATIC TESTER

CROSS REFERENCE TO OTHER APPLICATIONS

This application claims priority to U.S. Provisional Patent Application No. 60/922,096 entitled STAND ALONE QUASI STATIC TESTER AND CAMERA filed Apr. 6, 2007 which is incorporated herein by reference for all purposes.

BACKGROUND OF THE INVENTION

A read head assembly, or a head gimbal assembly (HGA), for a magnetic hard drive is tested before being assembled into a head stack assembly (HSA) and placed into a magnetic hard drive during production. Testing prevents the placement of an unqualified HGA in a hard drive. Dynamic testing of an HGA allows for a full suite of reading and writing tests to be performed. However, dynamic testing is time consuming and because of this expensive. If an HGA does not function well, a full suite of tests are not warranted. Quasi-static testing of an HGA allows for qualifying an HGA for dynamic testing or as a simple pass-fail test before placing an HGA in a drive. However, for quasi-static testing, proper identification of the HGA must be made so that test results are associated with the correct HGA unit. Also, if the HGA is not tested under the same conditions, then the results will not be useful in qualifying the HGA for dynamic testing or placing in a drive.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A stand-alone quasi-static tester is disclosed. The quasi-static tester enables testing of a head gimbal assembly (HGA). The quasi-static tester includes a camera for observing the HGA. The camera enables identification of the HGA by capturing an image of the HGA and reading the HGA identification (e.g., a serial number, bar code, etc.). The camera enables consistent positioning of the HGA for testing using the focal plane (i.e., the plane in which the HGA is in focus) of the camera and a center position (or any other consistent position) within a field of view. A slide that consistently moves the HGA from the focal plane and center point of the camera to a testing region enables consistent positioning for testing. Test results from the quasi-static tester can be stored in a memory associated with the HGA. In some embodiments, the memory is associated with a cartridge associated with the HGA that is used for dynamic testing.

Quasi-static testing with the ease of use provided by the optical positioning enables rapid consistent results that are coupled with the HGA identification number. This allows for easy prescreening of HGA parts before dynamic testing or assembly into drives.

Figure 1:
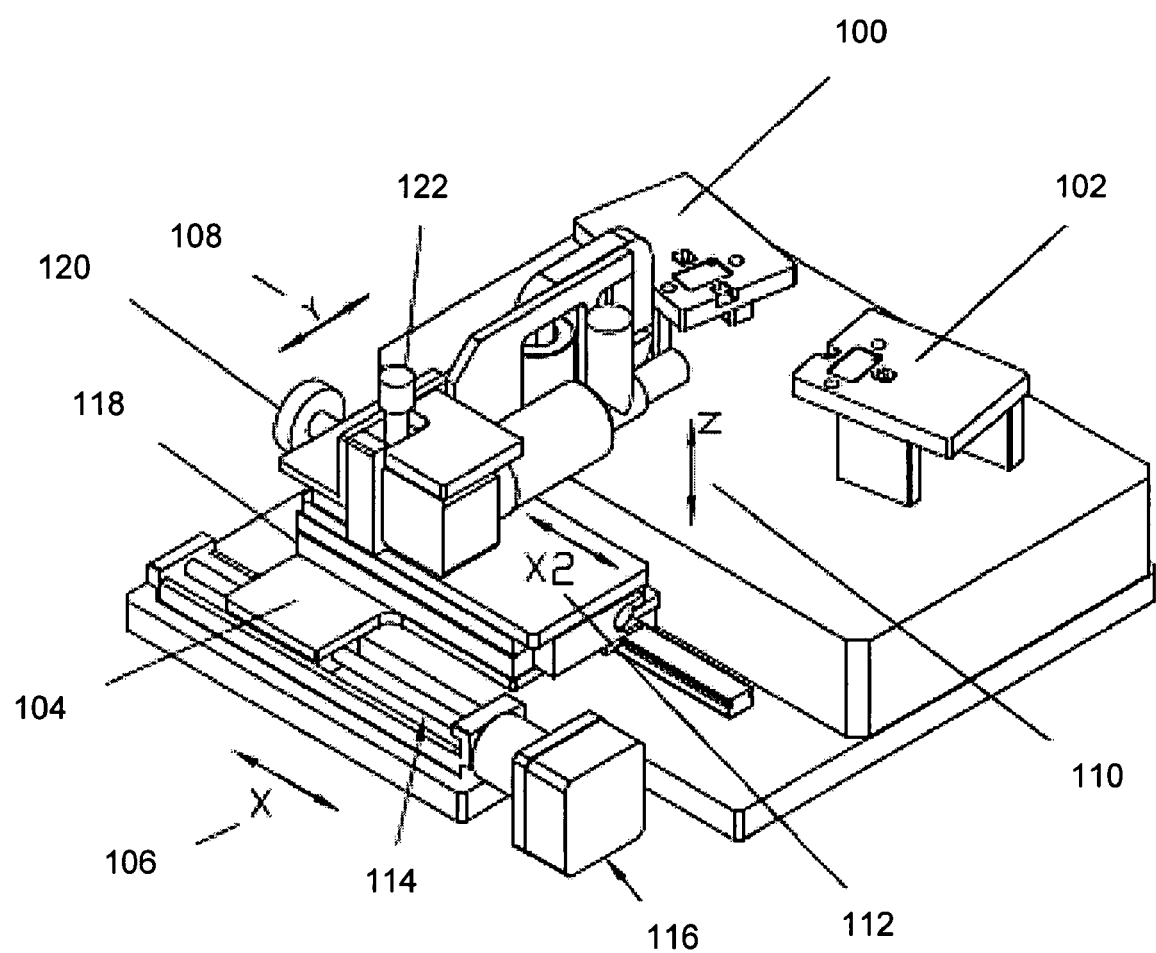
FIG. 1 is a block diagram illustrating an embodiment of a stand-alone quasi-static tester.

FIG. 1 is a block diagram illustrating an embodiment of a stand-alone quasi-static tester. In the example shown, a stand alone quasi-static tester includes stationary platforms 100 and 102 for mounting an HGA and a moving platform 104 for mounting a camera, optical lens, light source, and an electromagnet. The stand-alone quasi-static tester also includes four axes of movement—movement along X-axis 106, Y-axis 108, Z-axis 110, and a X2-axis 112, mounted on top of X-axis 106. Stationary platforms 100 and 102 position an HGA in an orientation that allows both identification using optical recognition and quasi-static testing using an electro-magnet assembly. Stationary platform 102 is used for clockwise (CW) heads and stationary platform 100 for counter-clockwise (CCW) heads. Moving platform 104, which includes a camera and a magnet assembly moves so that it can be aligned with a read head of an HGA mounted on either stationary platform 100 or 102.

X-axis 106 movement (i.e., horizontally across the focal plane or an XZ-plane) is controlled using lead screw 114 and stepper motor 116. Stepper motor 116 includes an encoder for position feedback. Fixed stroke actuator 118 moves parallel to the X-axis 106 and controls the X2-axis 112. Fixed stroke actuator 118 is mounted on top of moving platform 104. Manual micro-positioner 120 moves the camera and magnet assembly in the Y-axis (i.e., into and out of the camera focal plane or an XZ-plane). Manual micro-positioner 122 moves the assembly in the Z-axis (i.e., vertically across the focal plane or an XZ-plane).

The lead screw stage of lead screw 114 and stepper motor 116 is used to precisely move moving platform 104 to different positions for testing any HGA design in CW and CCW configurations. Moving platform 104 moves a camera, a magnet, and an X2-stage, Y-stage, and Z-stage. During the testing of a single HGA design, the lead screw will only move when switching between CW and CCW heads. HGA designs of any dimension can be accommodated with this configuration without changes to the stand-alone quasi-static tester.

Figure 2:
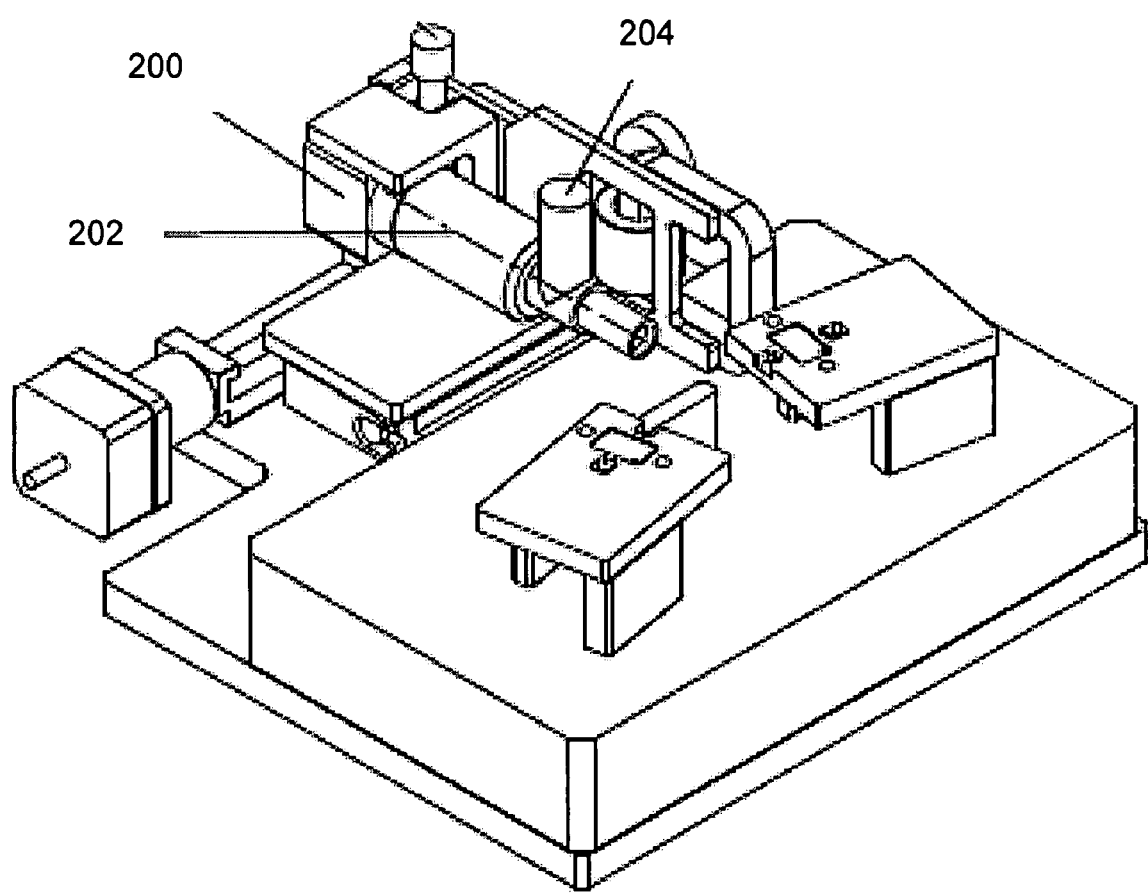
FIG. 2 is a block diagram illustrating an embodiment of a stand-alone quasi-static tester.

FIG. 2 is a block diagram illustrating an embodiment of a stand-alone quasi-static tester. In the example shown, HGA identification is obtained using video camera 200 with objective magnifying lens 202 and coaxial light source 204. In some embodiment, a high-resolution digital video camera is used. The use of a high-resolution camera minimizes the optical magnification required to provide an adequate pixels-per-character count for image processing of a serial number. By reducing the required optical magnification, a lens with a field of view large enough to cover the entire head surface, with extra space surrounding the head, can be used.

Figure 3A:
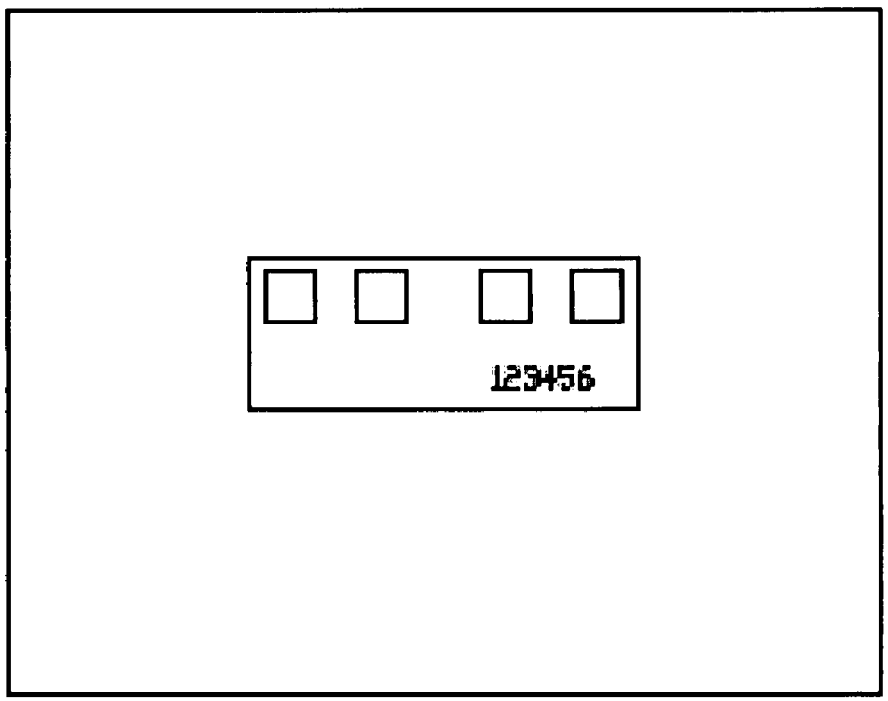
FIGS. 3A and 3B are block diagrams illustrating an image as captured by the camera in a stand-alone quasi-static tester in one embodiment.
Figure 3B:
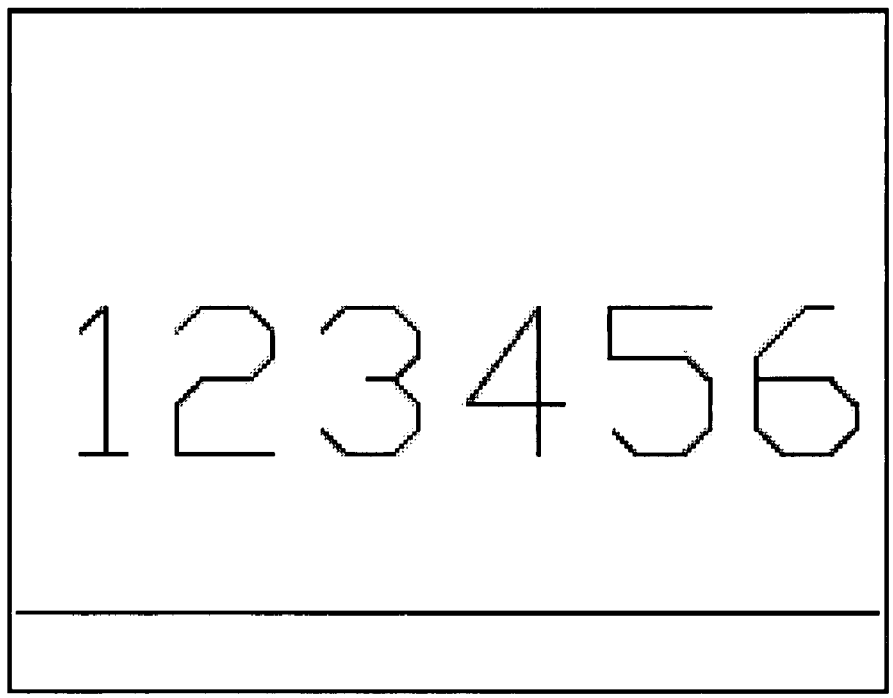

FIGS. 3A and 3B are block diagrams illustrating an image as captured by the camera in a stand-alone quasi-static tester in one embodiment. In the example shown in FIG. 3A, a large field of view reduces the time and precision required to align the camera with the head when compared to a high magnification. Alignment uses positioners that adjust the position of the camera and magnetic coil platform (e.g., moving platform 104 of FIG. 1) so that the HGA is in a position appropriate for viewing, in focus within the field of view, and for subsequent testing. In various embodiments, the HGA is centered, in a designated area within a captured image, or any other appropriate location. FIG. 3B shows a small field of view, in which only a small portion of the head surface is visible (e.g., the serial number on the HGA).

Figure 4A:
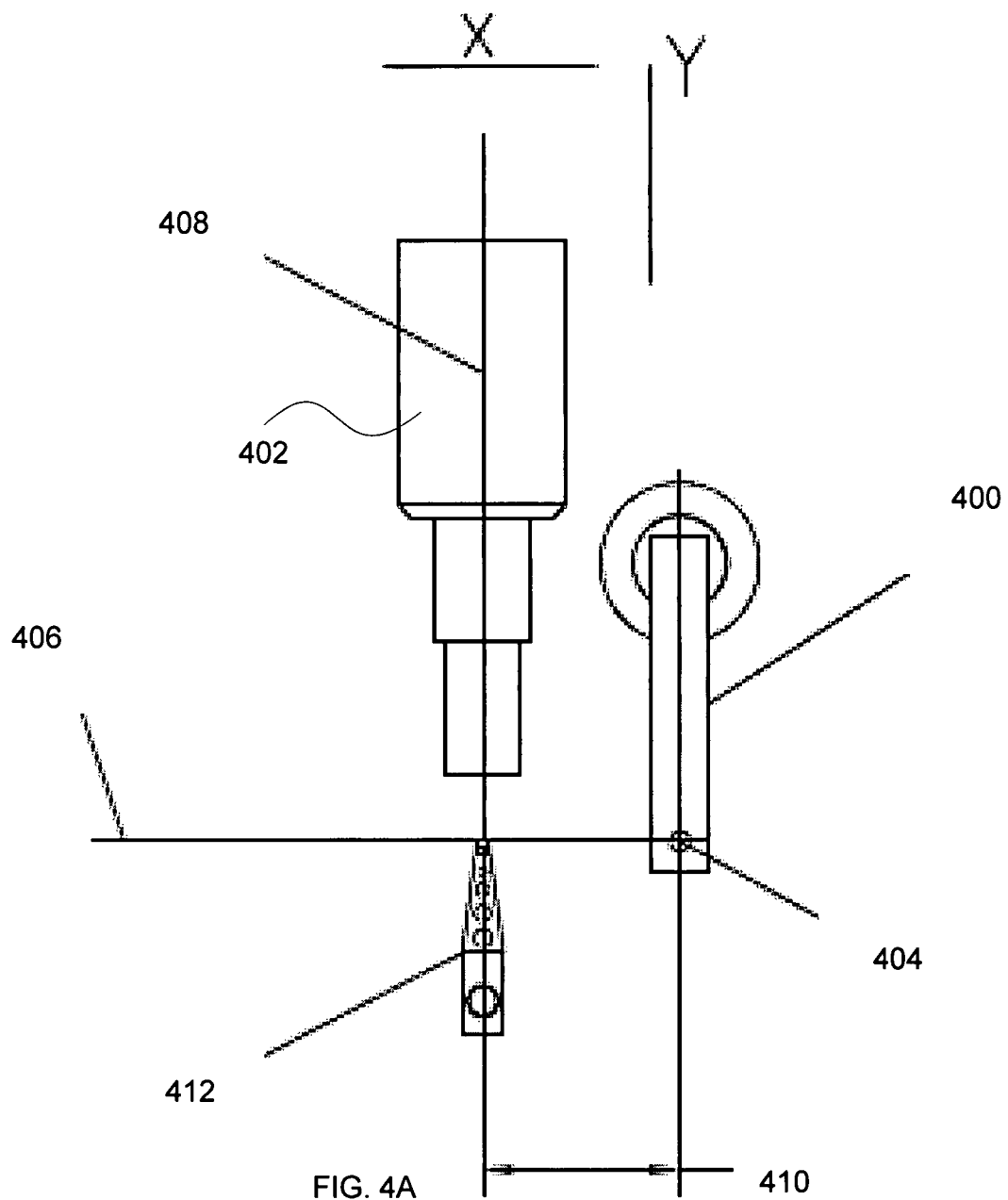
FIGS. 4A and 4B are block diagrams illustrating a camera and a magnet portion of a stand-alone quasi-static tester.
Figure 4B:
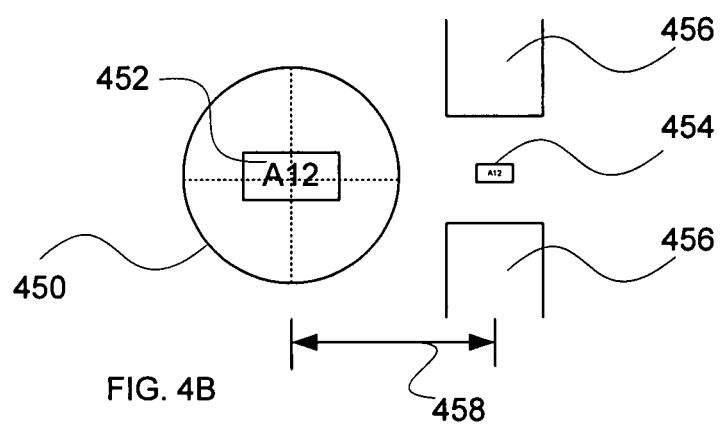

FIGS. 4A and 4B are block diagrams illustrating a camera and a magnet portion of a stand-alone quasi-static tester. In the example shown, in FIG. 4A electro-magnet 400 is mounted with a fixed relationship to objective magnifying lens 402 (e.g., objective magnifying lens 202 of FIG. 2). Objective magnifying lens 202 enables a camera (e.g., camera 200) as illuminated by a coaxial light source (e.g., coaxial light source 204) to image an HGA surface. Center point 404 of the electro-magnet's magnetic field and the focal plane of the lens 406 are aligned and permanently fixed in the Y-direction. Center point 404 of the magnetic field and the optical axis 408 of the lens and are at a known and fixed distance 410 apart in the X-direction. As the read head surface of the HGA 412 is brought into focus by moving objective magnifying lens 402 (and the attached camera and coaxial light source) in the Y-direction, center point 404 of the magnetic field is aligned with the head of HGA 412 in the Y-direction. A fixed stroke actuator moving in the X-direction (e.g., fixed stroke actuator 118 of FIG. 1) provides rapid movement of the camera and the electro-magnet as mounted on a moving platform (e.g., moving platform 104 of FIG. 1). The displacement of the actuator is permanently set to the exact X distance 410 between the camera lens focal point and the magnetic test field center (e.g., center point 404). The use of a dedicated fixed-stroke actuator for the X2-axis reduces test cycle time by providing quicker movement between camera and magnet test positions than is possible using a lead screw actuator (e.g., stepper motor 116 of FIG. 1).

In the example shown in FIG. 4B, a view through objective magnifying lens 402 is shown in circle 450. An HGA surface 452 is visible where the HGA markings can be observed and noted (e.g., an observation position). The HGA surface 452 can be aligned with the cross hairs in the view by changing the HGA position. This positioning accurately sets the position of the HGA—as shown by HGA 454 in the testing magnetic field (e.g., between magnet ends 456 in a testing position), when the HGA is moved fixed distance 458. This positioning using the positioning in the optical field of view enables consistent and repeatable testing of HGA's. Optical positioning provides in plane accuracy by placing the HGA in focus and within plane accuracy by using markings like a crosshair or dot in the field of view.

Figure 5:
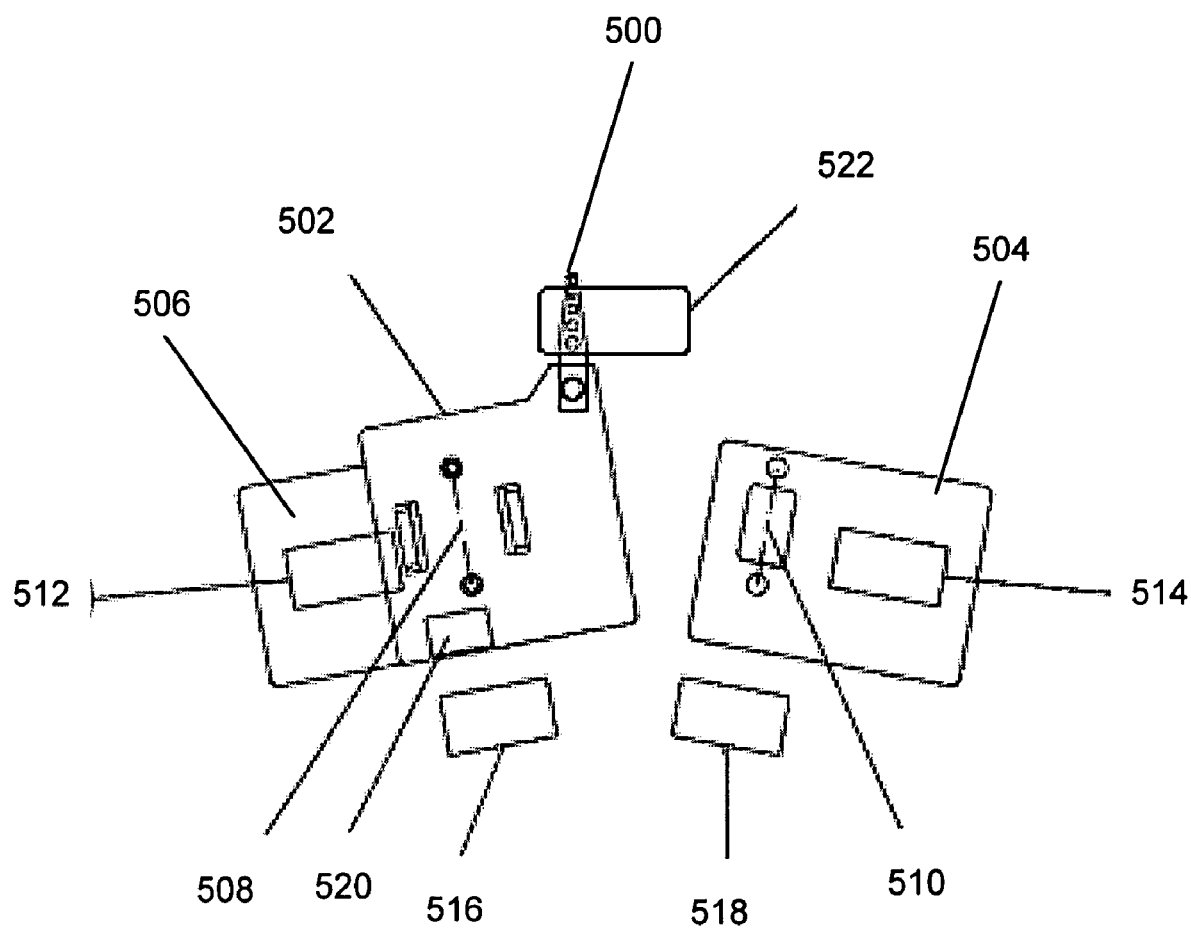
FIG. 5 is a block diagram illustrating an embodiment of stationary platforms and a cartridge.

FIG. 5 is a block diagram illustrating an embodiment of stationary platforms and a cartridge. In the example shown, HGA 500 is mounted on cartridge 502. Cartridge 502 is compatible with a dynamic tester (e.g., a Guzik V2002 spin-stand). This allows direct transfer of HGA 500 to a dynamic tester once identification and quasi-static testing has been completed. Stationary platforms 504 and 506 for cartridge 502 use a vacuum clamp. Cartridge vacuum clamp fitting 508 mounts to a stationary platform vacuum clamp fitting. Stationary platform vacuum clamp fitting 510 is shown for stationary platform 504. Cartridge vacuum clamp fitting 508 mounts to a vacuum clamp fitting similar to stationary platform vacuum clamp fitting 510 on a dynamic tester. The same cartridge can be used on both a quasi-static tester and a dynamic tester without modification. In some embodiments, the vacuum clamp detects the presence of the cartridge and head assembly.

Mounted close to stationary platforms 504 and 506, there are interfaces to a magnetic head coupled to cartridge 504. The magnetic head is part of HGA 500. These interfaces are coupled to head-amplifiers 512 and 514. Stationary platforms 504 and 506 also include interfaces 516 and 518 to cartridge data storage (e.g., cartridge EEPROM 520). In some embodiments, dynamic tester pre-amplifiers are similar to stand-alone quasi-static tester head-amplifiers so that cartridge 504 can be used on both types of testers.

To hold HGA 500 at the correct angle for identification and quasi-static testing, support 522 is used. Support 522 is centered about both mounting points 508 and 510 to provide consistent repeatability on both CW and CCW type read heads. The length of support 522 is adjustable to match the length of the HGA suspension being tested. Height of support 522 is also adjustable to achieve the correct angle for HGA 500. Support 522 can be attached to an actuator that moves in the Z-direction to retract support 522 when installing and removing cartridges from the platforms.

In some embodiments, cartridge 502 is able to rotate upside down while attached to stationary platforms 504 and 506 enabling easier mounting of HGA 500 on cartridge 502.

Figure 6:
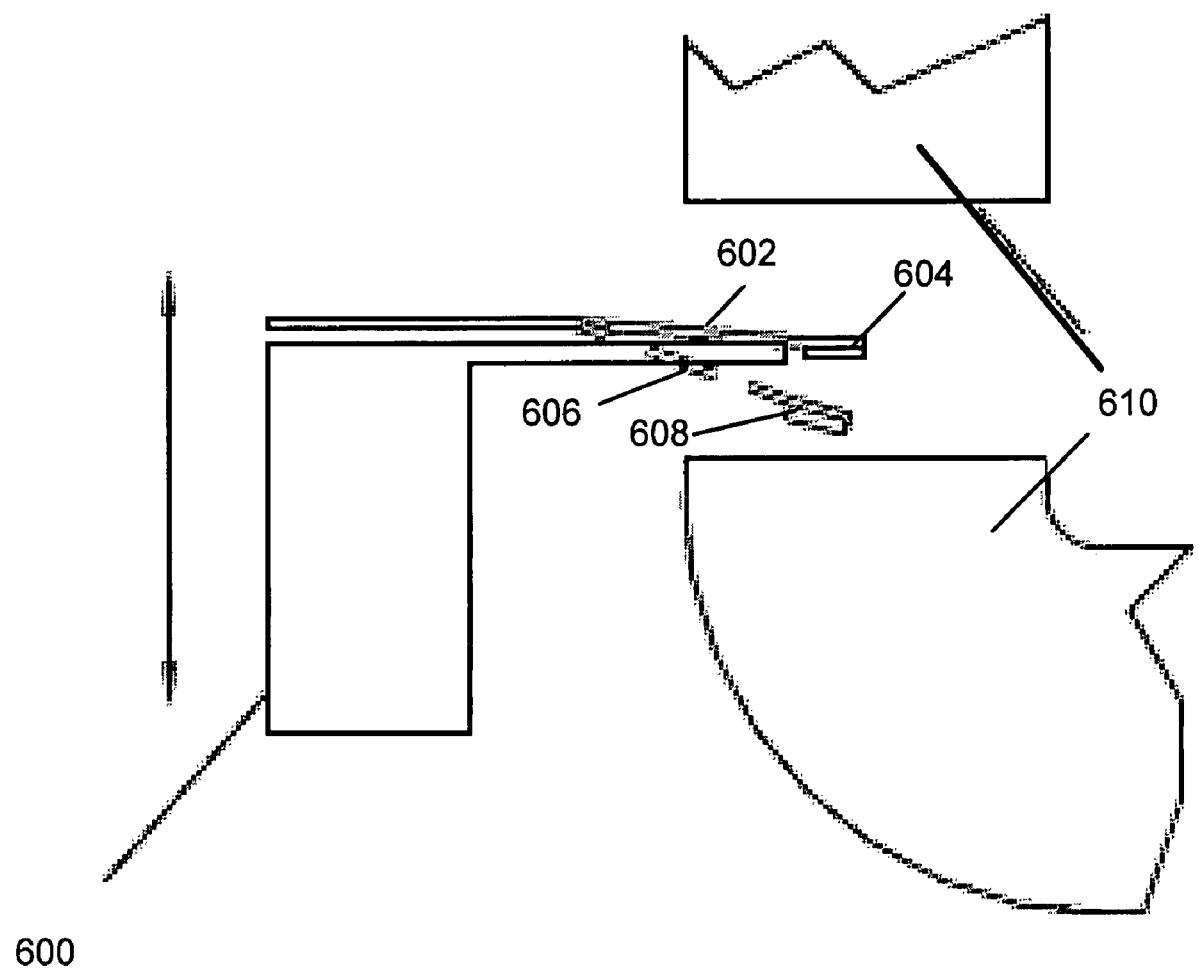
FIG. 6 is a block diagram illustrating an embodiment of a support for an HGA.

FIG. 6 is a block diagram illustrating an embodiment of a support for an HGA. In the example shown, support 600 is moved up and down to position HGA 602 and head 604 coupled to HGA 602 to a proper position for identification of HGA 602 and for quasi-static testing. The proper position for quasi-static testing requires being in the appropriate position with respect to electro-magnet 610. In some embodiments, electro-magnet 610 has a region of relatively uniform magnetic field enabling testing using known magnetic field strengths. HGA 606 with coupled head 608 is also shown in its free state position when not supported by support 600.

Figure 7:
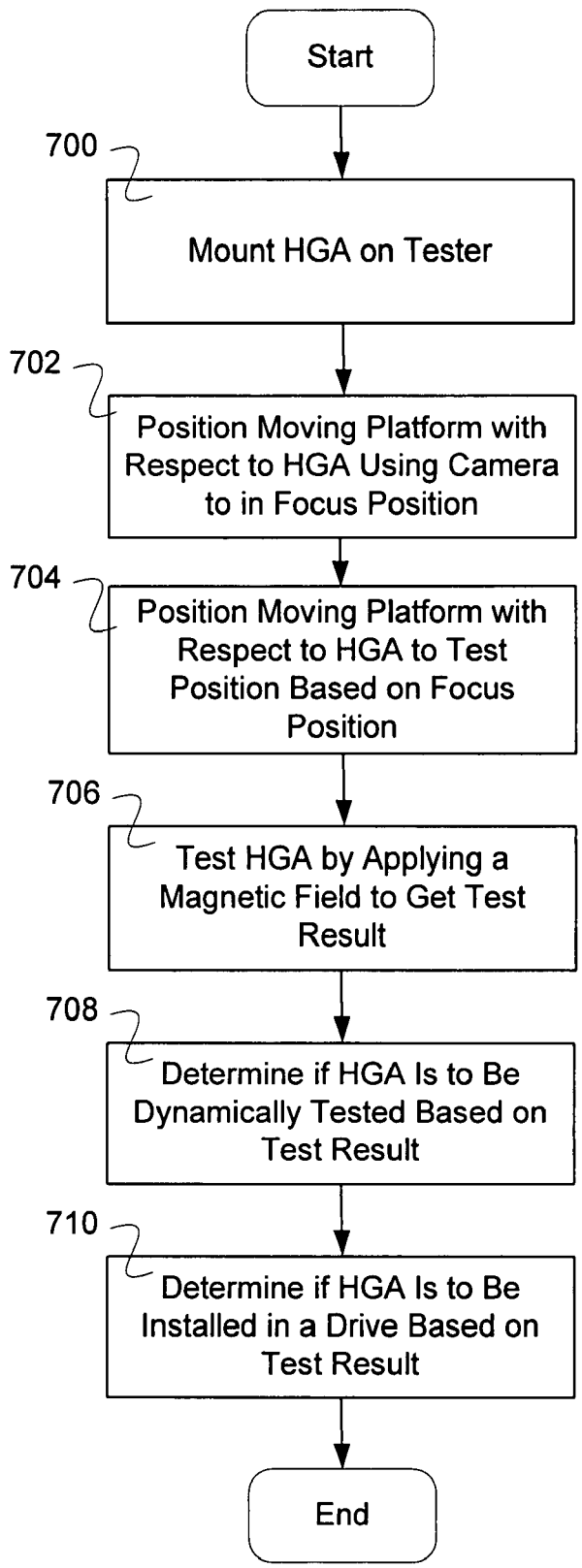
FIG. 7 is a flow diagram illustrating a process for quasi-static testing.

FIG. 7 is a flow diagram illustrating a process for quasi-static testing. In the example shown, in 700 an HGA is mounted on a quasi-static tester. The HGA is mounted on a cartridge that is mounted on a stationary platform of a quasi-static tester. In 702, a moving platform is positioned with respect to the HGA using a camera to be in focus. The camera and an electro-magnet are coupled to the moving platform. The electro-magnet is used for testing. When the HGA is positioned with respect to the camera so that the HGA is in focus, a serial number of the HGA is read. In some embodiments, the HGA serial number is read using optical character recognition performed on a captured image from the camera. In various embodiments, the HGA is identified using a bar code or any other appropriate designators. The serial number is stored on a memory. In some embodiments, the memory is attached to a cartridge that can be mounted in a dynamic tester. In 704, a moving platform is positioned with respect to HGA to a test position based on the focus position. In some embodiments, the moving platform is positioned from focus position to test position using a fixed stroke actuator. In 706, the HGA is tested using a magnetic field to get a test result. In 708, it is determined if the HGA is to be dynamically tested based at least in part on the test result. In 710, it is determined if the HGA is to be installed in a hard drive based at least in part on the test result.

Figure 8:
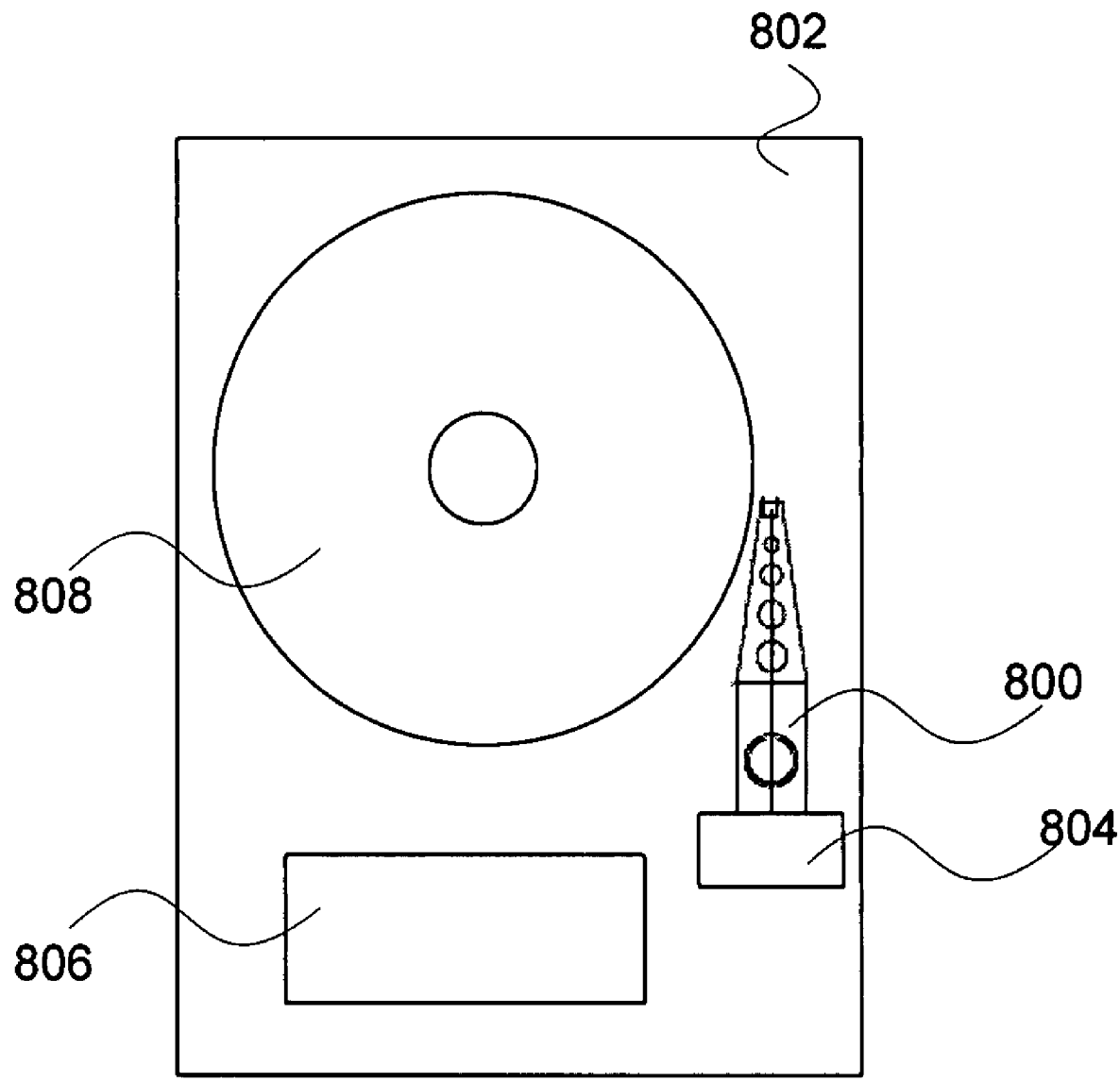
FIG. 8 is a block diagram illustrating an embodiment of a hard drive.

FIG. 8 is a block diagram illustrating an embodiment of a hard drive. In the example shown, HGA 800 is installed in hard drive 802. In some embodiments, HGA 800 is first assembled into a head stack assembly (HSA). HGA is able to access test parameters (e.g., static and/or dynamic test derived test results) stored in memory 804. In some embodiments, memory 804 is not included in hard drive 802. HGA 800 is used for reading and writing a magnetic spinning media 808. The signal for reading and writing using HGA 800 is generated, processed, etc. by hard drive electronics 806.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An apparatus for testing a magnetic head in a head gimbal assembly comprising:
    a fixed mount adapted to receive the head gimbal assembly such that the head is in a fixed test position; and
    a movable mount comprising a test magnet and a camera comprising an objective lens, said test magnet and camera being movable in fixed relation to each other;
    wherein
    the camera is configured to observe a feature on the head;
    the movable mount is configured to move the test magnet to a desired position relative to the fixed test position based on positioning information determined from the observation of the feature, and
    the test magnet is configured to provide a magnetic field at the test position for testing the head.

2. The apparatus of claim 1, wherein the movable mount is configured to move the camera while the camera observes the feature to determine focus information representative of a position of a focal plane of the objective lens relative to the feature on the head gimbal assembly, and
    wherein the positioning information comprises the focus information.

3. The apparatus of claim 2, wherein the camera is configured to provide field position information representative of the position and orientation of the feature within a field of view of the objective lens, and
    wherein the positioning information comprises the field position information.

4. The apparatus of claim 3, wherein the movable mount is configured to
    move along a first dimension to a position such that the position of the feature coincides with the focal plane of the objective lens, and
    move within a plane orthogonal to the first dimension to a position such that the position and orientation of the feature coincides with a desired position and orientation in the field of view.

5. The apparatus of claim 4, further comprising a display coupled to the camera, wherein the display is configured to display the field of view, and wherein the movable platform comprises one or more manual position adjusters configured to allow the user to move the movable mount so that the position and orientation of the feature coincides with a desired position and orientation in the field of view.

6. The apparatus of claim 5, wherein the display is configured to show a marking corresponding to the desired position and orientation in the field of view.

7. The apparatus of claim 1, wherein the movable mount is configured to move to a first position based on the positioning information, and move along a fixed path from the first position to a final position for testing the head.

8. The apparatus of claim 7, wherein the movable mount comprises a fixed stroke actuator configured to move the movable mount along the fixed path from the first position to the final position.

9. The apparatus of claim 1, further comprising a cartridge adapted to receive the head gimbal assembly, said cartridge removably mountable on the fixed mount.

10. The apparatus of claim 9, wherein the cartridge is adapted to be compatible with a further testing system.

11. The apparatus of claim 10, wherein the cartridge comprises a memory configured to receive and store at least one from the group of: test information based on a signal from the head generated in response to the magnetic field, head identity information from the camera determined based on the observation of the feature.

12. The apparatus of claim 1, wherein the camera is configured to determine head identity information identifying the head based on the observation of the feature.

13. The apparatus of claim 12, wherein the feature comprises one or more characters, and the camera is configured to determine the head identity information by applying optical character recognition to one or more observed characters.

14. The apparatus of claim 1, wherein the fixed mount comprises a first mount adapted to receive a clockwise head gimbal assembly such that the head of the head gimbal assembly is in the fixed test position and a second mount configured to alternately receive a counter clockwise head gimbal assembly such that the head of the head gimbal assembly is in the fixed test position.

15. The apparatus of claim 1, wherein the fixed mount comprises a support configured to support the head in a desired orientation at the desired test position.

16. The apparatus of claim 1 wherein the movable mount comprises a light source to direct light to the feature along a path substantially coaxial with light collected by the objective lens.

17. A method for testing a magnetic head in a head gimbal assembly comprising:
    mounting the head gimbal assembly such that the head is in a fixed test position;
    observing a feature on the head using a camera with an objective lens to determine positioning information from the observation of the feature, said camera being movable in fixed relation to a test magnet;

moving the camera and test magnet, in fixed relation to each other, into a desired position relative to the fixed test position based on the position information;

using the test magnet, generating a magnetic field at the fixed test position for testing of the head;

determining head test information about the heat based on a signal generated by the head in response to the magnetic field at the test position; and outputting the head test information.

18. The method of claim 17, further comprising determining whether to install the head in a disk drive based at least in part on the head test information.

19. An article comprising
a disk drive comprising a magnetic head, the magnetic head having been determined to be suitable for installation in the disk drive by the method of claim 18.

20. The method of claim 17, further comprising:
determining head identity information identifying the head based on the observing the feature; and
outputting the head identity information.

21. The method of claim 20, further comprising storing at least one of the group of: the head test information and the head identity information in a memory, wherein the memory is associated with the head gimbal assembly.

22. The method of claim 17, further comprising identifying the head as a candidate for additional testing based on the head test information.

23. The method of claim 17, wherein the observing the feature comprises moving the camera while observing the feature to determine focus information representative of a position of a focal plane of the objective lens relative to the feature, and wherein the positioning information comprises the focus information.

24. The method of claim 23, wherein the observing the feature comprises:
using the camera to determine field position information representative of the position and orientation of the feature within a field of view of the objective lens, and
wherein the positioning information comprises the field position information.

25. The method of claim 24, wherein the moving the camera and test magnet into a desired position relative to the fixed test position based on the positioning information comprises:
moving the camera and test magnet along a first dimension to a position such that the position of the feature coincides with the focal plane of the objective lens, and
moving the camera and test magnet within a plane orthogonal to the first dimension to a position so that the position and orientation of the feature coincides with a desired position and orientation in the field of view of the objective lens.

26. The method of claim 17, further comprising moving the test magnet to a first position based on the positioning information, and moving the test magnet along a fixed path from the first position to a final position for testing the head.

27. The method of claim 26, wherein moving the test magnet along a fixed path from the first position to a final position comprises moving the test magnet with a fixed stroke actuator.

* * * * *